United States Patent [19]
Lyons et al.

[11] Patent Number: 5,160,874
[45] Date of Patent: Nov. 3, 1992

[54] ROTATABLE WARNING LIGHT ASSEMBLY

[75] Inventors: Harold W. Lyons, Killingworth; James L. Stopa, Old Saybrook, both of Conn.

[73] Assignee: Whelen Technologies, Inc., Chester, Conn.

[21] Appl. No.: 647,581

[22] Filed: Jan. 28, 1991

Related U.S. Application Data

[62] Division of Ser. No. 403,710, Sep. 6, 1989, Pat. No. 5,027,260.

[51] Int. Cl.⁵ ............................................. H02P 5/00
[52] U.S. Cl. .................................... 318/268; 362/74; 340/471
[58] Field of Search ................. 318/467, 468, 64, 599, 318/254, 268, 439, 138, 778, 779, 780, 798-812; 362/74, 240, 249, 219; 340/468, 471, 472, 474, 478; 388/811, 814, 819

[56] References Cited

U.S. PATENT DOCUMENTS

| | | | |
|---|---|---|---|
| 3,575,648 | 4/1971 | Ridding | 318/67 X |
| 3,757,232 | 9/1973 | Matsuda | 318/467 X |
| 4,780,655 | 10/1988 | Layh | 318/468 |
| 4,864,322 | 9/1989 | Yamamoto et al. | 318/603 X |

Primary Examiner—A. Jonathan Wysocki
Attorney, Agent, or Firm—Chilton, Alix & Van Kirk

[57] ABSTRACT

A modular-type lightbar assembly has an elongated base having a bottom panel and a pair of oblique integrally extending front and rear sides. Lens elements are mounted to the base and a cover by lock and groove-type connections. Warning beacon units are mounted to platforms supported on base. The beacon units rotate for sequentially directing light through the front and rear lens elements. The beacon units have an efficient integral base which mounts the rotating beacon and a brush assembly for the motor. An electronic controller is employed to apply a pulse width modulated current to the beacon motor so that a fast and slow motor speed may be selected.

11 Claims, 6 Drawing Sheets

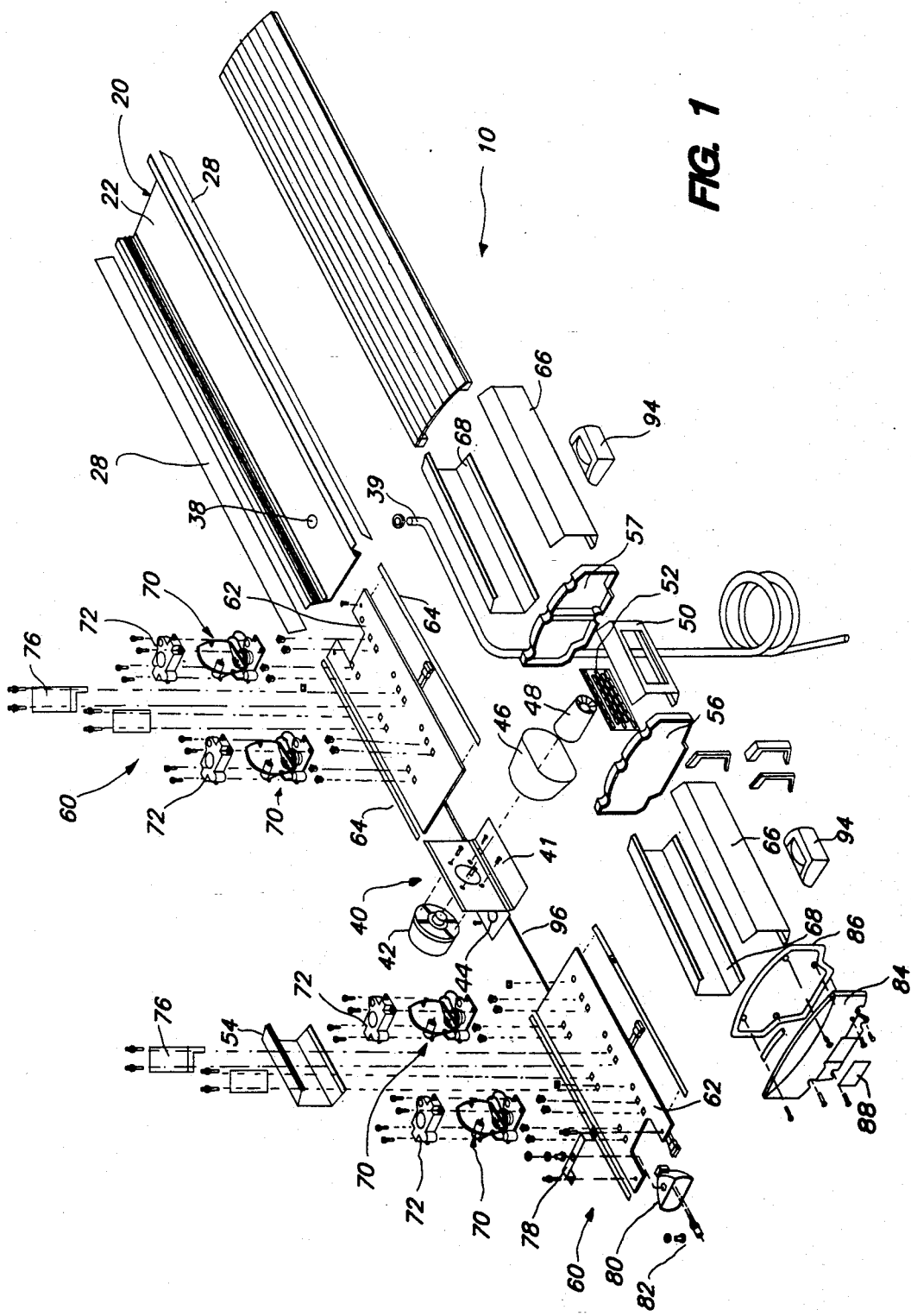

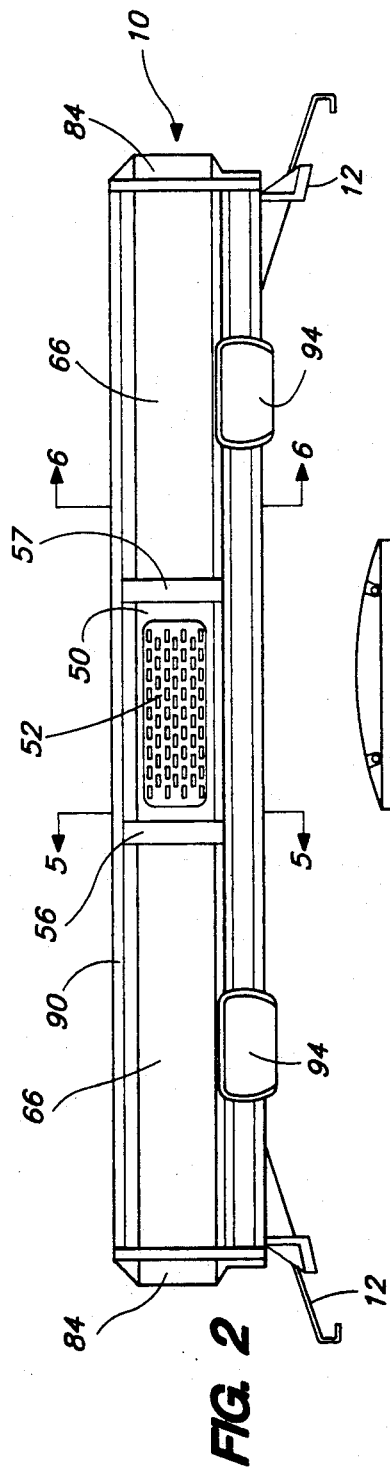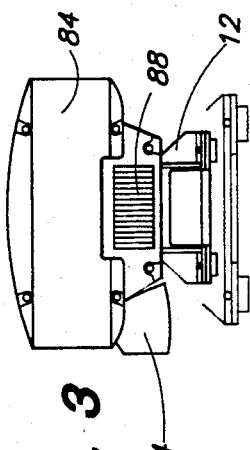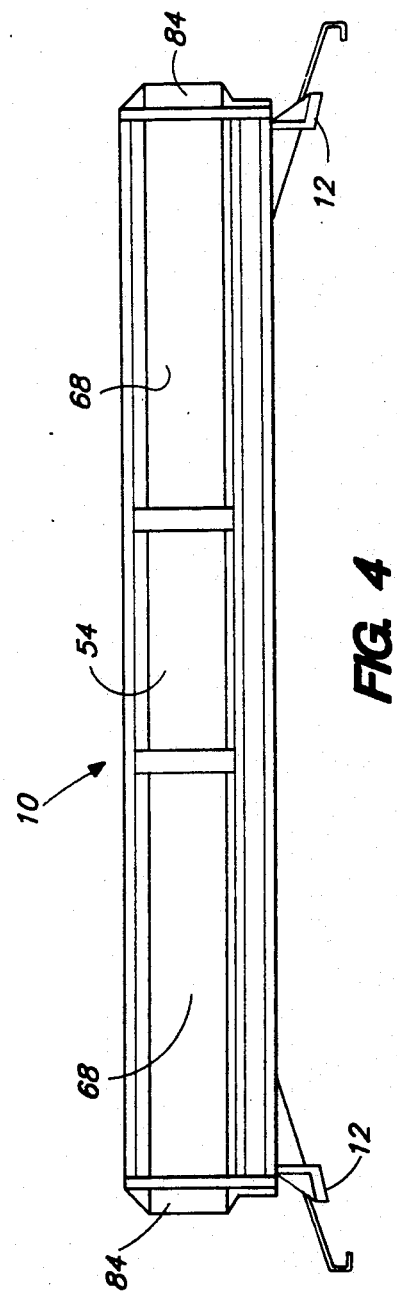

ROTATABLE WARNING LIGHT ASSEMBLY

This application is a divisional of co-pending U.S. application Ser. No. 07/403,710 now U.S. Pat. No. 5,027,260.

BACKGROUND OF THE INVENTION

1. Field of the Invention

This invention relates generally to rotating beacon-type lights for use in lightbar assemblies which are mounted to the top of vehicles.

2. Description of the Prior Art

The lightbar assemblies to which the invention relates have in the past been built around an I-beam type structural member which spans the assembly. U.S. Pat. No. 4,588,118 and U.S. Pat. No. 4,620,268, both of which are assigned to the assignee of the present invention, each disclose lightbar assemblies which employ an I-beam as the principal structural member. The I-beam members provide an efficient low profile, modular structure of high structural integrity and a high degree of versatility. However, the I-beam does present space constraints which limit flexibility in implementing a wide range of emergency signal configurations. In particular, the conventional lightbar assemblies which employ rigid frame members spanning the lightbar assemblies have had insufficient space for installation of warning lights comprising halogen lamps with associated rotating mirrors.

SUMMARY OF THE INVENTION

Briefly stated, the present invention is a rotatable warning light for use in a lightbar assembly for an emergency vehicle or the like. A lightbar assembly with which the invention may be used comprises, in a preferred embodiment, an elongated base which has a bottom panel and two sides which integrally extend therefrom at an oblique angle to the bottom panel. Rails integrally extend inwardly from the sides to define transversely spaced support channels. Upper portions of the sides include transversely spaced mounting grooves. A platform is received in a pair of oppositely facing of the support channels. A first lens element forms a front light transmissive panel which has a longitudinally extending tongue received in one of the spaced mounting grooves in the base. A second lens element forms a rear light transmissive panel which has a second longitudinally extending tongue received in the other mounting groove. A cover is mounted to the front and rear lenses and connects therewith in generally tongue-and-groove-type engagements, the cover, base and lens elements defining a housing in which light generators may be mounted on the platform.

In a typical installation, multiple rotatable warning beacons are mounted to the platform. The beacons include a lamp for emitting radiation and an associated reflector for reflecting the radiation. A motor rotates the reflector so that the radiation is sequentially transmitted through the front and rear lens elements as a series of discrete flashes. End caps are mounted to end portions of the base and the front and rear lens elements and the cover for interlocking the base, the front and rear lens elements and the cover and for enclosing the warning beacons. An audio warning unit may also be mounted to the base for generating an audible warning signal. The audio warning unit is disposed between sets of front and rear lens elements. Dividers are employed at intermediate longitudinal positions for engaging peripheral portions of the front and rear lens elements for transversely interlocking the elements. A frame member which includes an upstanding panel may be mounted in the support channels for mounting the audio warning unit.

A rotatable beacon assembly in accordance with the invention includes an integrally formed base having a pair of brush holders and a spindle which is located between the holders. An upstanding bracket also extends from the base. A motor is mounted to the bracket. Brushes are mounted in the holders. The motor which is in drive engagement with a worm drive. A worm wheel, engagable with the worm drive, is rotatably mounted to the spindle. The worm wheel also mounts a pair of slip rings which are engaged by engaged by respective of the brushes. A beacon, which includes a lamp and an associated reflector, is mounted in fixed rotatable relationship with the worm wheel. The brush holders, in a first embodiment, each comprise an upstanding boss having a plurality of fingers for mounting a brush. The worm drive is rotatable about a first axis and the worm wheel, which meshes with the worm gear, is rotatable about a second axis, which is generally orthogonal to the first axis.

The present invention also encompasses a novel electronic controller for the warning beacon which comprises a circuit for deriving a substantially constant voltage and current from the vehicle power supply for application to an incandescent lamp. The controller includes a switch which is actuatable between states commensurate with fast and a slow motor speed. A modulation circuit is responsive to the switch state and pulse width modulates the source voltage when the slow motor speed is selected. A second circuit, responsive to the "fast" switch state, applies the source voltage to the motor. The current supplied to the motor is isolated from the current supplied to the lamp. The modulation circuit includes a timer which generates a pulsed output signal which is applied to a transistor for modulating the voltage applied to the motor when the slow motor speed is selected. A second circuit, responsive to the "fast" switch state, applies the source voltage to the motor. The timer is disabled when the fast motor speed is selected. In the disclosed embodiment, an opto-coupler comprising a photo-emitter and a photodetector is employed for disabling the timer, the input signal to the opto-coupler being remotely generated by the operator of the vehicle on which the light bar is installed.

BRIEF DESCRIPTION OF THE DRAWINGS

FIG. 1 is an exploded view of a vehicular lightbar assembly which employs a rotatable warning light in accordance with the present invention;

FIG. 2 is a front elevational view of the lightbar assembly of FIG. 1;

FIG. 3 is a side elevational view of the lightbar assembly of FIG. 1;

FIG. 4 is a rear view of the lightbar assembly of FIG. 1;

DETAILED DESCRIPTION OF THE INVENTION

Figure 5:
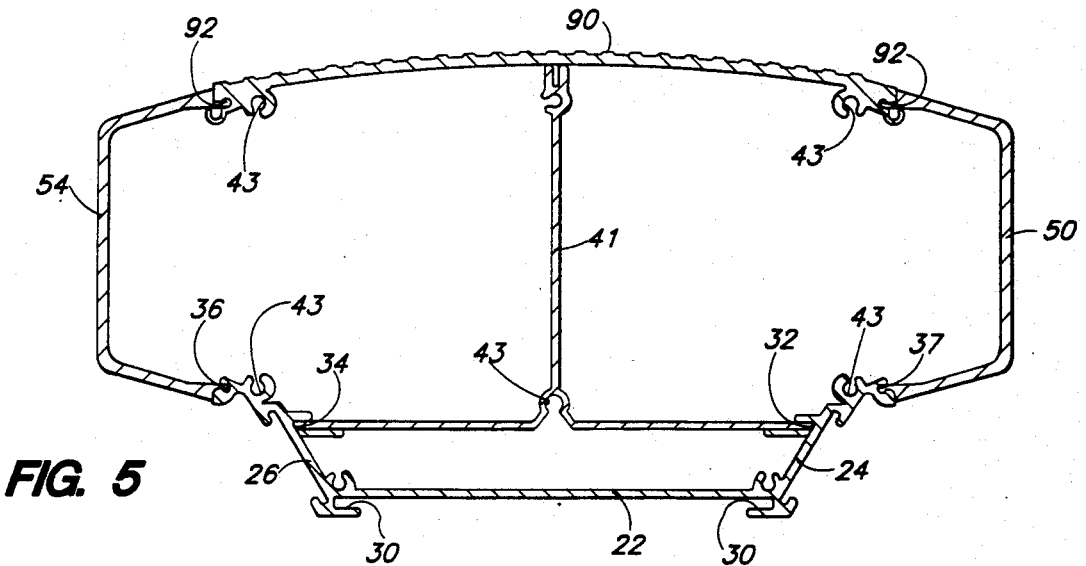
FIG. 5 is a cross-sectional view of the lightbar assembly of FIG. 2 taken along the line 5—5 thereof, portions being removed.

With reference to the drawings, wherein like numerals represent like parts throughout the figures, a vehicular lightbar assembly is designated generally by the numeral 10. The vehicular lightbar assembly is adapted for mounting at the top of an emergency vehicle, such as an ambulance, police car or fire emergency vehicle. The lightbar assembly 10 has a low profile and a length which spans a substantial portion of the width of the vehicle. The lightbar assembly 10 is characterized by a modular design which allows wide lattitude in the selection of the number and location of the emergency warning devices which may be integrated into the assembly, i.e., the light bar may be configured in accordance with the requirements of a specific application.

The lightbar assembly is secured to the top of the vehicle (not illustrated) by means of conventional mounting foot assemblies 12 (FIGS. 2–4) which are disposed at opposing longitudinal end locations of the lightbar assembly. The mounting foot assemblies 12 are adjustable for a wide variety of vehicular makes, models, and types. The mounting foot assemblies essentially engage the underside of the lightbar assembly at the opposing end locations and may be similar in form and function to the mounting foot assemblies disclosed in U.S. Pat. No. 4,588,118.

The lightbar assembly 10 electrically communicates with the vehicle power supply (not illustrated) to provide electrical power for the assembly warning signals. The lightbar assembly also electrically communicates with command switches in the vehicle passenger compartment to permit the operator to selectively operate the lightbar assembly as will be described hereinafter.

The structural integrity of the lightbar assembly 10 is provided by an integrated multi-component assembly which is constructed in an efficient interlocking manner. The lightbar assembly 10 has a low profile which not only is structurally suitable for the vehicular applications, but has a modular construction which provides a wide range of possible warning signal configurations. An extruded aluminum base 20 spans the length of the lightbar assembly. The base 20 functions as the principal support structure for the lightbar assembly. The extruded base comprises a bottom panel 22 and integral front and rear sides or panels 24 and 26. The bottom panel 22 is horizontally disposed across the vehicle top when the assembly is mounted to the vehicle. The front panel 24 and the rear panel 26 extend respectively frontally and rearwardly in an angled orientation to the bottom panel. The bottom panel 22 also has an opening 38 for receiving an electrical cable 39 comprising conductors which deliver power and command signals to the lightbar assembly.

The exteriors of the front and rear panels form spaced grooves which slidably receive elongated strips 28 affixed with the name plate and identifying information for the lightbar assembly. The lower portions of the base form a pair of transversely spaced opposing channels 30 which receive the mounting foot assemblies 12. Pairs of laterally spaced, integral inwardly extending rails define opposed slots 32 and 34 which extend longitudinally along the respective panels 24 and 26 of the base 20 at an intermediate vertical position. The upper outer portions of each of the front and rear panels have respective generally outwardly facing, longitudinally extending grooves 36 and 37.

Various warning signal modules may be incorporated into the lightbar assembly. An audio warning or siren unit 40 disposed centrally of the lightbar assembly employs an extruded driver support frame 41. The driver frame 41 includes an upstanding central panel, having an opening which mounts a siren driver 42, which extends upwardly from a platform. As may be seen from FIG. 5, outer edge portions of driver support frame 41 are slidably received in the opposed slots 32 and 34 of the extruded base 20. The driver frame 41 includes bottom panel openings 44 which mount grommets to provide access for the electrical leads to the driver 42. An inner bell 46 and a siren tip 48 are mounted to the driver 42. The bell 46 and tip 48 are disposed on an opposite side of the upstanding panel from the driver 42.

A frontally projecting, quasi-C-shaped element 50 has an integral lower tongue which slidably interlocks with the base groove 36. The front element 50 has an opening. A siren grill 52 is mounted across this opening. A rearwardly projecting, quasi-C-shaped element 54 also includes an integral tongue which interlocks with the groove 37 of the base so that the siren unit 40 is frontally and rearwardly enclosed.

Dividers 56 and 57 are dimensioned and shaped to provide complementary retainer flanges for receiving the longitudinal end portions of the driver frame 41, the front siren element 50, and the rear siren element 54 to reinforce and interlock the structures into a structurally rigid unit. Fasteners may be threaded through the dividers into integrally formed sockets 43 of the bottom or platform portion of the driver frame 41 to enhance the structural integrity of the siren unit. The siren unit 40 is transversely centrally disposed on the base 20 with the longitudinally spaced dividers 56 and 57 providing front and rear exposed flange-like retaining bands.

In the disclosed embodiment a pair of substantially identical warning light sub-assemblies 60 are mounted at opposed sides of the central siren unit 40. Each warning light sub-assembly 60 includes a platform 62. A pair of elongated sound isolator strips 64 are mounted along transversely spaced edges of the platform 62. The platform/strips are slidably mounted in the intermediate channels 32 and 34 of the extruded base 20. A rotatable warning beacon unit 70 in accordance with the invention mounted to the platform 62 by means of screw/grommet fastener assemblies which extend through a beacon cover 72. An upright stepped mirror assembly 76 is also mounted to the platform 62 between the beacon unit 70 and the siren unit 40.

A flattened inverted U-shaped mounting bracket 78 is mounted to the notched end portion of the platform 62. The bracket 78 mounts an "alley" light comprising a reflector 80 which receives a high intensity halogen lamp 82. Front and rear quasi-C-shaped lens elements 66 and 68 have transversely extending integral tongues which slidably interlock in the respective grooves 36 and 37 of the extruded base 20 to frontally and rearwardly enclose each warning light sub-assembly 60. The lens elements may have fluted inner surfaces defined by spreader optic bands which are separated by flats.

The dividers 56 and 57 have flanges which receive the end portions of the lens elements 66 and 68. The outer end portions of the lens elements are capped by an end cap 84. The end cap 84 has a flange-like structure dimensioned for retaining the outer end portions of the lens elements and for mounting over the ends of the extruded base 20 in complementary fashion. A gasket 86 is interposed between the end cap and the outer end portions of the lens elements 66 and 68 and the extruded base 20. Each end cap 84 includes an opening. A lens element 88 is mounted across this opening to provide a lens cover for the end "alley" light. Typically, the "alley" lights at each end of the lightbar are separately and selectively energized from the main electrical power supply.

A top cover 90 of aluminum longitudinally spans the lightbar assembly. The cover 90 has a slight convex contour which terminates in transversely spaced longitudinally extending grooves 92. The grooves 92 slidably interlock with the corresponding tongues of the front and rear lens elements 66 and 68, the front and rear siren elements 52 and 54 and the dividers 56 and 57. The dividers 56 and 57 are preferably dimensioned so that the underside of the top cover 90 engages and rests on the top edge of the dividers. The end caps 84 abut against the end portion of the cover 92 to complete the integrated interlocking housing structure. The foregoing components may be secured in position by threaded fasteners which are longitudinally driven into integrally formed sockets 43 of the various components.

Figure 6:
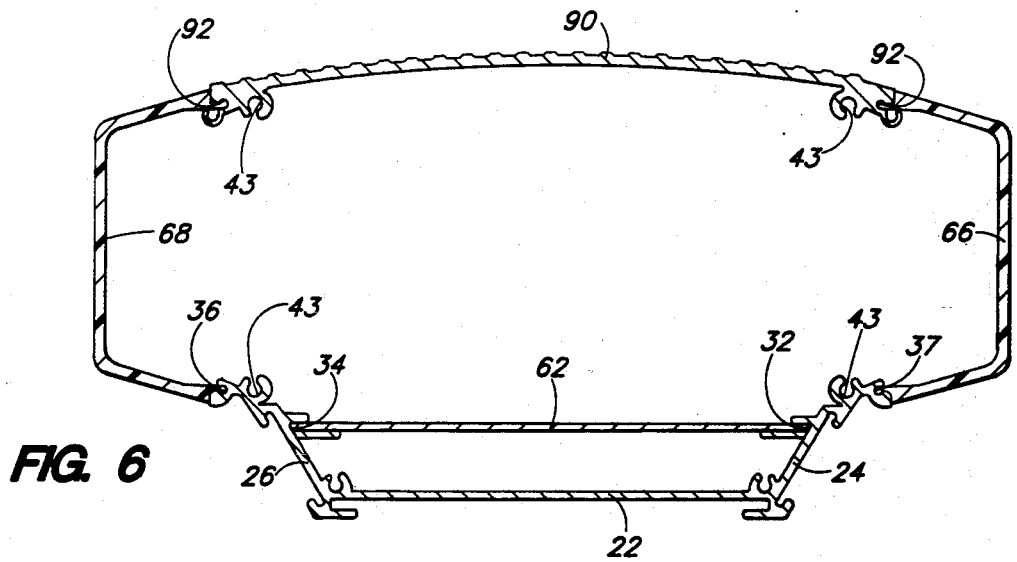
FIG. 6 is a cross-sectional view of the lightbar assembly of FIG. 2 taken along the line 6—6 thereof, portions being removed.

As will be obvious from the above description and the drawings, the aluminum cover 90 is opaque and thus light generated within the lightbar assembly is not lost by transmission through the top of the assembly and a narrowly defined, and thus highly visible, warning device is provided. As may be seen from FIGS. 1, 5 and 6, the width of cover 90 exceeds the width of the bottom panel 22 and the platform 62 which supports the light generators, i.e., the rotatable warning beacon units 70.

"Take-down" light modules 94 are also mounted at the lower front mid-section of each of the warning light sub-assemblies 60. The "take-down" modules are typically halogen lamps and associated reflectors. The "take-down" lights function as spot lights which generate an intense light so that it is extremely difficult in the dark for a person in the illumination field to determine the precise position of a person standing rearwardly of the lightbar assembly. The electrical cable 39 leads through the opening 38 in the base and connects with an electrical harness 96 which is routed through the trough defined by the space in base 20 located below the platforms 62 to provide an electrical network for the lightbar assembly. Typically, the "take-down" lights are operated independently.

Figure 7:
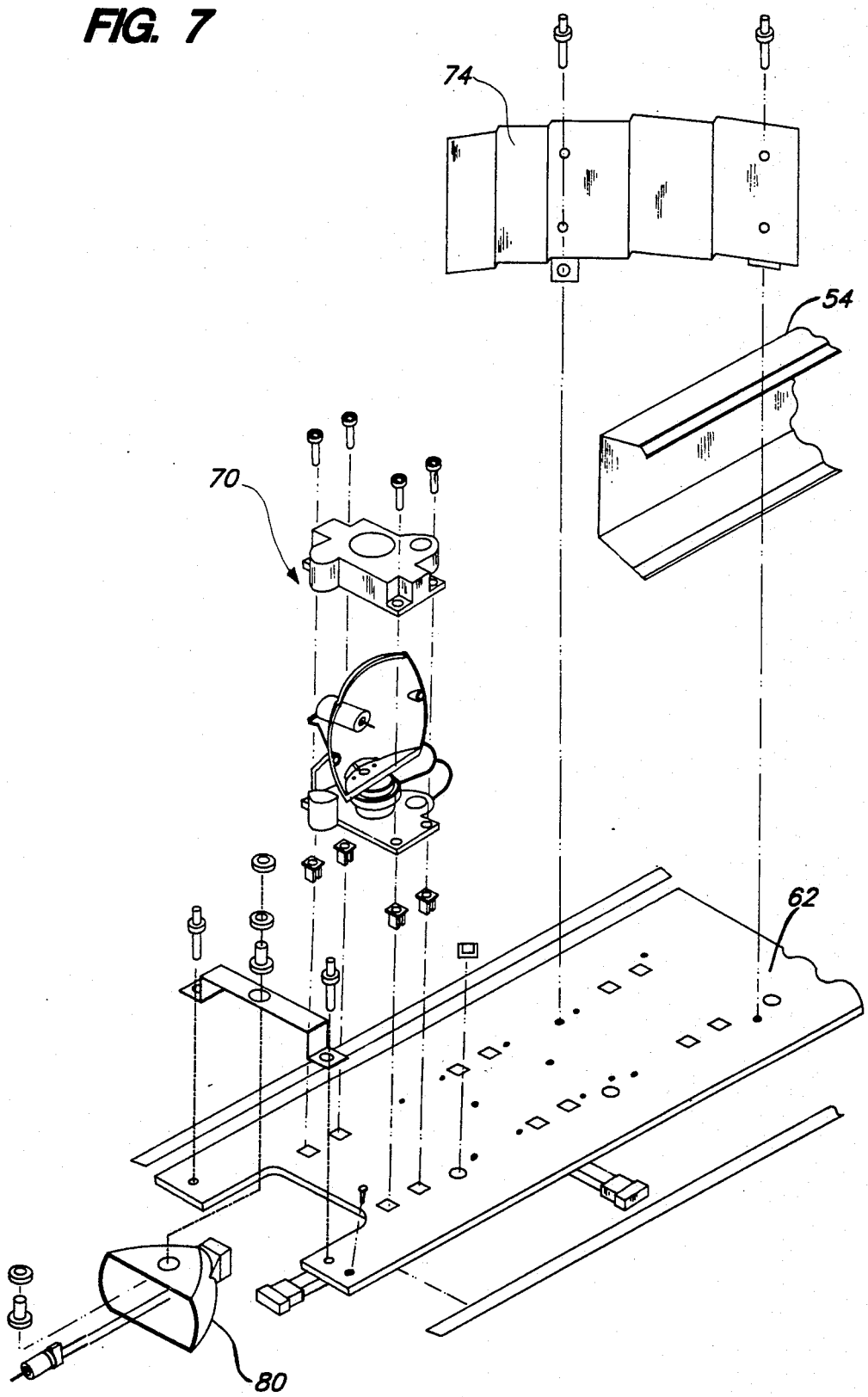
FIG. 7 is an exploded view of a sub-assembly of a lightbar assembly in accordance with the present invention.

The enclosure for each warning and light sub-assembly is essentially an open shell defined between the front and rear lens elements 66 and 68. With reference to FIGS. 1 and 7, the warning light sub-assembly 60 may include one or a plurality of the novel longitudinally spaced rotatable beacon units 70. The number of beacon units 70 may be varied in accordance with the requirements of a given application. If more than one such beacon unit is employed, partitions in the form of reflector plates 74 may be interposed between the rotatable beacon units. The beacon units 70 are identical modular units and are specifically designed to have an efficient low-cost construction so that the rotatable beacon units may be easily dismounted and replaced should they become defective or damaged.

Figure 8:
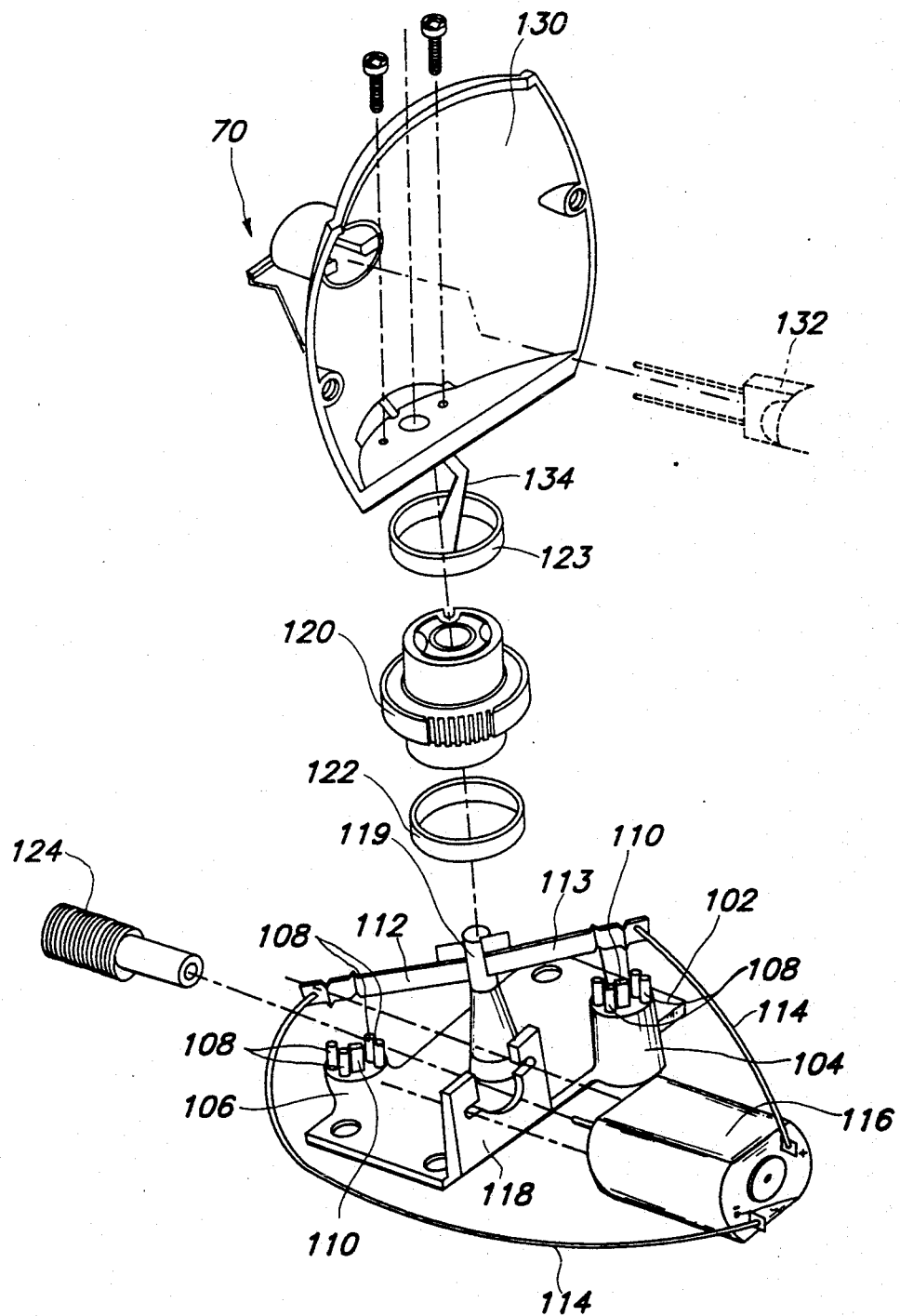
FIG. 8 is an exploded view of a first embodiment of a rotating warning beacon in accordance with the invention.

With reference to FIG. 8, a rotatable beacon unit 70 in accordance with a first embodiment of the invention comprises an integral molded base 102 which mounts onto the platform 62. The base 102 has a pair of integral bosses 104 and 106. Each of the bosses include projecting retainer fingers 108 and a central inverted L-shaped catch 110. The fingers 108 and catch 110 of each of the bosses 104 and 106 cooperatively respectively mount lamp current supply brush assemblies 112 and 113. The brush assemblies 112 and 113 are, in the disclosed embodiment, connected via leads 114, to electrical terminals provided on an electric motor 116, such as a Johnson-Model No. HF213G. An upstanding integral bracket 118 extends from the base 102 and defines a slot for mounting the motor 116.

An integral tapered spindle 119 medially located between bosses 104 and 106 forms an upper shaft which rotatably mounts a fifty tooth worm wheel assembly 120. The wheel assembly includes axially spaced rims which mount a pair of slip rings 122 and 123. The slip rings are engaged by the respective brushes 112 and 113. The motor drives a worm shaft 124 which meshes with the worm wheel 120 for rotatable motion thereof. The rotational axes of the worm shaft 124 and the worm wheel 120 are orthogonal to each other.

A reflector 130, which may comprise a metalized parabolic dish and a bottom panel, is mounted in fixed relationship to the top of the worm wheel assembly 120. A halogen lamp 132, or other suitable light emitter, is mountable in an integrally formed socket of the reflector 130. Electrical leads 134 extend from electrical contacts in the socket through an opening in the base plate and a slot in the worm wheel assembly to complete a current supply path between the slip rings through the filament of lamp 132. It should be appreciated that the rotatable beacon unit 70 has a very efficient one-piece integral motor base/brush holder/spindle configuration which allows a very efficient replacement of the unit from the lightbar assembly if required.

Figure 9:
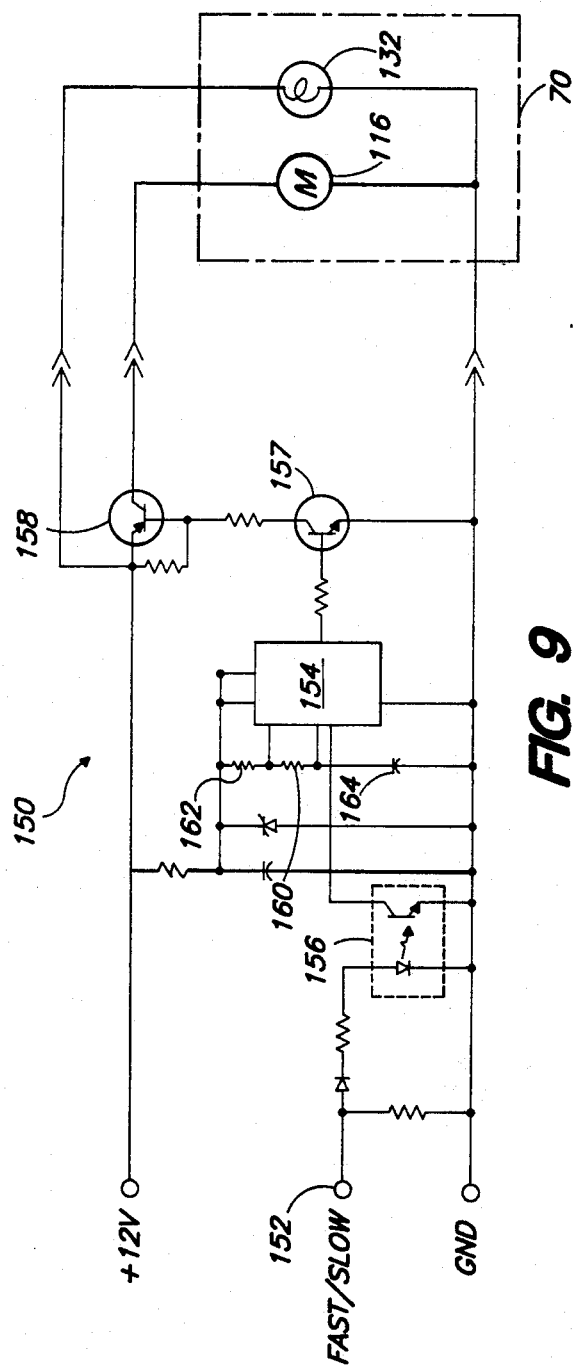
FIG. 9 is a simplified schematic circuit diagram of an electronic controller for the rotating warning beacon of FIG. 8.

A motor drive control circuit for the rotating beacon unit 70 is generally designated by the numeral 150 in FIG. 9. The control circuit 150 is connected to the vehicle electrical power supply and functions to provide a constant voltage to the lamp 132 and a pulse width modulated voltage to the motor 116. A fast/slow speed selector is coupled to a 555-type integrated circuit timer 154. In the disclosed embodiment the speed selector includes an opto-coupler 156 which functions as a switch. The speed selector is employed to command either a fast or slow speed for motor 116. The control circuit 150 efficiently functions to isolate the modulated power supplied to the motor 116 from the constant power supplied to the lamp 132.

The 555-type timer 154 controls, via a first switching transistor 157, the state of a main switching transistor 158 which is connected in series with the current source and motor 116. When the phototransistor of the opto-coupler is in the conductive state, commensurate with a "high" speed command, the timer 154 is disabled by the grounding of pin 2 thereof. Accordingly, main switching transistor 158 will be in the conductive state and the supply voltage will be applied to the DC motor 116. As noted, the state of transistor 158 is controlled by transistor 157 which is in the off state when the timer is not providing output pulses. When pin 2 of timer 154 is released from ground, and the timer delivers pulses to the base of transistor 157, transistor 157 will be periodically rendered conductive. The conduction of transistor 157 will ground the base of transistor 158 and will thus periodically interrupt the flow of current through transistor 158 to motor 116. The resulting pulse width modulation of the supply voltage to motor 116 will lower the average voltage applied to the motor and will accordingly reduce the speed at which the motor will operate. Resistors 160 and 162 and capacitor 164 can be suitably selected to vary output frequency of timer 154 and thereby vary the slow speed of the motor.

Figure 10:
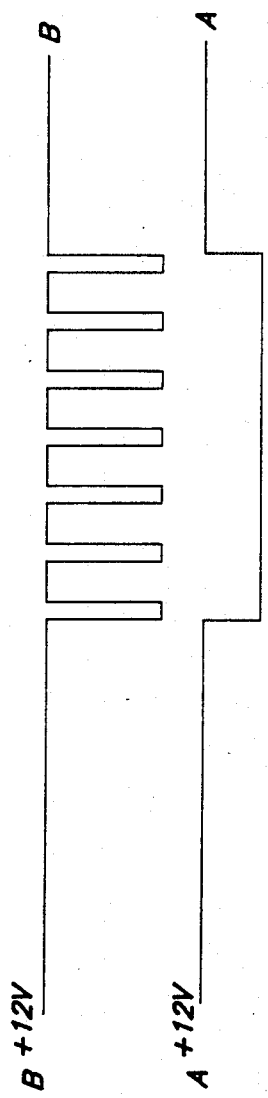
FIG. 10 is a timing diagram depicting the voltage waveforms which appear at various points in the circuit of FIG. 9.

The waveforms for the application of the electrical current to the motor are illustrated in FIG. 10. Graph A illustrates the relationship of the "fast" and "slow" command signals delivered to input terminal 132 of the controller circuit. Graph B shows the voltage applied to the motor 116 for the corresponding "fast" and "slow" speed commands. The controller of the present invention acheives constant temperature operation of the reflector drive motor by the use of pulse width modulation and also keeps the maximum motor drive voltage constant. Additionally, since the switch 158 which acheives the pulse width modulation of the motor supply voltage is "downstream" of the point of connection of the lamp to the power supply, the lamp is effectively isolated from the variations in the motor supply voltage resulting from the operation of the switch 158.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A rotatable warning light assembly comprising:
   light generator means, said light generator means including a rotatable reflector and a light source, said light source being supported from said reflector for rotation therewith;
   coupling means for delivering electrical and mechanical energy to said light generator means, said coupling means including a drive gear and a pair of electrically conductive slip rings, said coupling means being mechanically connected to said reflector whereby the application of a rotational force to said coupling means will cause rotation of said reflector and light source, said drive gear and slip rings being mounted coaxially and said slip rings being electrically isolated from one another, said coupling means further comprising means electrically connecting said slip rings to said light source;
   unitary base means for supporting said light generator means, said base means including spindle means for defining an axis of rotation of said reflector and coupling means, said coupling means being rotatably engaged by said spindle means and being coaxial therewith, said base means also including a pair of spacially displaced brush holders, said brush holders being respectively juxtapositioned to a said slip ring of said coupling means, said base means further including means for supporting a motor;
   motor means, said motor means comprising an electrical drive motor mounted on said motor supporting means, said motor having a rotatable output shaft;
   means for converting rotation of said motor output shaft to rotation of said coupling means drive gear about the axis of said spindle means, said translating means including a worm gear driven by said motor output shaft, said worm gear engaging said coupling means drive gear; and
   brush means disposed in each of said base means brush holders, said brush means being resiliently biased against respective of said slip rings whereby electrical current may be supplied to said light source via said brush means and slip rings.

2. The warning light assembly of claim 1 further comprising:
   controller means for said motor and said light source, said controller means including:
   first circuit means connectable to a source of electrical power to supplying a substantially constant voltage to said lamp;
   selector means for providing command signals commensurate with a fast or slow speed of said motor;
   modulator means responsive to command signals provided by said selector means for generating a series of pulses when the slow speed is selected; and
   second circuit means connectable to the source of electrical power and to said motor and responsive to said modulator means generated pulses for applying a substantially constant voltage to said motor when the fast speed is selected and for applying a pulse width modulated voltage having a maximum amplitude substantially equal to said constant voltage when the slow speed is selected.

3. The beacon assembly of claim 2 wherein said modulator means comprises a timer, said timer generating pulses, and wherein said second circuit means comprises a first solid state switch for modulating the current delivered to said motor means.

4. The beam assembly of claim 3 wherein said modulator means further comprises a second solid state switch responsive to the pulses provided by said timer, said second switch being connected to said first switch means to cause the periodic closing of said first switch means.

5. The beacon assembly of claim 4 further comprising adjustment means for implementing a pre-established pulse width for the pulses generated by said modulator means.

6. The beacon assembly of claim 5 wherein said disabling means comprises an opto-coupler including a photo-emitter and a phototransistor.

7. The warning light of claim 1 wherein said coupling means drive gear and slip rings are located in longitudinally displaced planes which are transverse to said spindle means axis and wherein the height of said brush holders is commensurate with the longitudinal location of the associated slip ring.

8. The warning light of claim 1 wherein said motor output shaft is oriented generally transversely with respect to the axis of said spindle means.

9. The warning light of claim 7 wherein said motor output shaft is oriented generally transversely with respect to the axis of said spindle means.

10. The warning light of claim 9 further comprising:
    means electrically connecting said motor means and said brush means to a source of electrical power.

11. The warning light of claim 10 wherein said means for electrically connecting said motor and brushes to a source of electrical power comprises:
  controller means, said controller means including:
    first circuit means for respectively connecting said brush means to opposite polarity terminals of a direct current source;
    selector means for providing command signals commensurate with a fast or slow speed of said motor;
    modulator means responsive to command signals provided by said selector means for generating a series of pulses when the slow speed is selected; and
  switch means connected between said motor and a first polarity terminal of the direct current source, said switch means being responsive to the pulses generated by said modulator means for supplying a first voltage from the direct current source to said motor means when the fast speed is selected and for applying a pulse width modulated voltage having a maximum amplitude substantially equal to said first voltage to said motor when the slow speed is selected.

* * * * *